No. 710,879. Patented Oct. 7, 1902.
J. A. MITCHELL.
SCREW CONVEYER.
(Application filed Apr. 26, 1902.)
(No Model.)
Fig. 1,
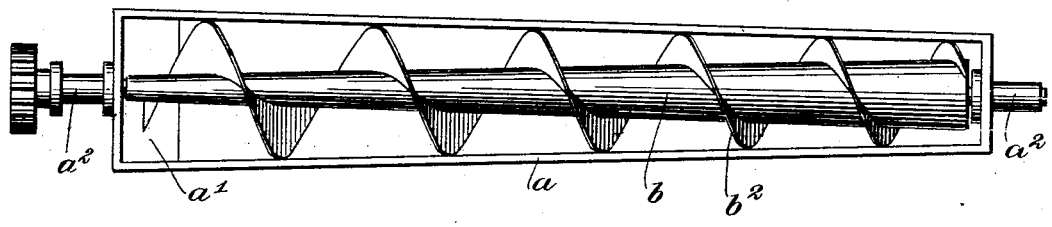
Fig. 2,
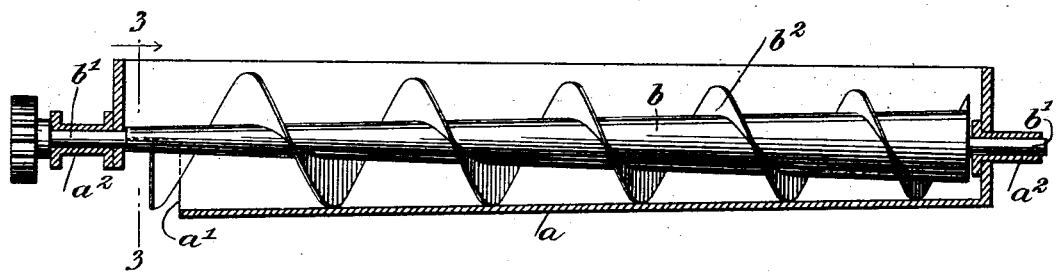
Fig. 3.
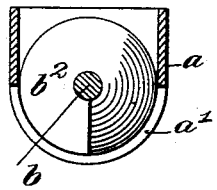
WITNESSES:
Edward Thorpe
Isaac B. Owens
INVENTOR
Joseph A. Mitchell
BY
ATTORNEYS

UNITED STATES PATENT OFFICE.

JOSEPH A. MITCHELL, OF BROOKLYN, NEW YORK.

SCREW CONVEYER.

SPECIFICATION forming part of Letters Patent No. 710,879, dated October 7, 1902.

Application filed April 26, 1902. Serial No. 104,784. (No model.)

*To all whom it may concern:*

Be it known that I, JOSEPH A. MITCHELL, a citizen of the United States, and a resident of the city of New York, borough of Brooklyn, in the county of Kings and State of New York, have invented a new and Improved Screw Conveyer, of which the following is a full, clear, and exact description.

The object of this invention is to provide a screw conveyer which will be capable of receiving material along its entire length and of uniformly advancing all of the material received. If an ordinary screw is placed in a conveyer-trough and material fed to it along its entire length, the mass of material gathered by the screw is rolled entirely around and the screw discharges no more in a given period of revolution than would be discharged in the same period were the material fed merely for a distance along the screw equal to the pitch thereof—that is to say, the longitudinal distance between one turn of its blade. By means of my invention, however, the screw may be fed along its entire length, and owing to the peculiar form of the screw it will discharge—say, for example, in one revolution—an amount of material equal to that received by it during such revolution.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a longitudinal section thereof, and Fig. 3 is a section on the line 3 3 of Fig. 2.

$a$ indicates the trough of the screw, which is open at its upper side throughout its length and which is gradually enlarged or flared from its receiving to its discharge end, and at the discharge end an orifice $a'$ is formed to permit the material to pass out. In the ends of the trough $a$ are placed boxes $a^2$, which carry the journals $b'$ of the screw.

$b$ indicates the core of the screw, and this core is tapered gradually from the receiving to the discharge end of the trough, the core being largest at the receiving end of the conveyer and tapering into nearly the thickness of the journals at the discharge end. On this core $b$ is placed the thread $b^2$ of the screw. The thread increases in height or radius steadily from the receiving to the discharge end of the screw not only to compensate for the difference in the diameter or taper of the core $b$, but also to make the diameter of the screw greater at the discharge than at the receiving end, as is illustrated in Figs. 1 and 2. The trough $a$ is flared toward the receiving end, so as to accommodate this increase in diameter or flare of the screw. It will be observed, therefore, that the increase in the height or radius of the blade $b^2$ is not only proportioned to the increase in diameter of the core, but is even greater in proportion, so that the exterior form of the screw gives it a flare or gradual increase in diameter toward the receiving end.

It may be observed in connection with the screw thus constructed that material may be fed into the top of the trough $a$ throughout its entire length and that the screw will steadily clear itself and advance through the discharge-orifice $a'$ all of the material fed into the trough. Such an apparatus placed in the bottom of the hopper will feed the material out of the same much more rapidly than a screw of the ordinary construction.

Having thus described my invention, I claim as new and desire to secure by Letters Patent—

1. In a conveyer the combination of a screw comprising a core tapered toward the discharge end, and a blade or thread gradually increased in height or radius toward the discharge end, and a trough conforming to the form of the screw and open at the top throughout the length thereof, said trough receiving the screw.

2. A conveyer-screw, comprising a core tapered toward the discharge end, and a blade or thread gradually increased in height or radius toward the discharge end, said increase in the height or radius of the blade or thread being sufficient to give the exterior form of the screw a flare or increase of diameter toward its discharge end.

3. In a conveyer the combination of a screw comprising a core tapered toward the discharge end, and a blade or thread gradually increased in height or radius toward the discharge end, said increase in the height or radius of the blade or thread being sufficient to give the exterior form of the screw a flare or increase of diameter toward its discharge end, and a trough in which said screw is placed, the trough conforming to the form of the screw and being open at its top throughout the length thereof.

4. A conveyer-screw, comprising a core tapered toward the discharge end, a blade or thread gradually increased in height or radius toward the discharge end, said increase in the height or radius of the blade or thread being sufficient to give the exterior form of the screw a flare or increase of diameter toward its discharge end, and a trough in which said screw is placed, the trough conforming to the form of the screw and being open at its top throughout the length thereof, said trough having a discharge-orifice formed in its bottom directly adjacent to the discharge end.

In testimony whereof I have signed my name to this specification in the presence of two subscribing witnesses.

JOSEPH A. MITCHELL.

Witnesses:
ISAAC B. OWENS,
JNO. M. RITTER.